US008478565B2

(12) United States Patent
Ardanese et al.

(10) Patent No.: US 8,478,565 B2
(45) Date of Patent: Jul. 2, 2013

(54) METHOD OF MONITORING SOOT MASS IN A PARTICULATE FILTER AND MONITORING SYSTEM FOR SAME WITH CORRECTION FOR ACTIVE REGENERATION INEFFICIENCY

(75) Inventors: Raffaello Ardanese, Birmingham, MI (US); Michelangelo Ardanese, Ann Arbor, MI (US); Rebecca J. Darr, Milford, MI (US); Paul Jasinkiewicz, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 389 days.

(21) Appl. No.: 12/829,700

(22) Filed: Jul. 2, 2010

(65) Prior Publication Data

US 2012/0004863 A1 Jan. 5, 2012

(51) Int. Cl.
*G01G 7/00* (2006.01)

(52) U.S. Cl.
USPC .......................................................... 702/173

(58) Field of Classification Search
USPC .......................................................... 702/173
See application file for complete search history.

(56) References Cited

U.S. PATENT DOCUMENTS

| 7,153,342 | B2 | 12/2006 | Koga et al. |
| 7,677,032 | B2 | 3/2010 | Berryhill et al. |
| 7,684,924 | B2 | 3/2010 | Darr et al. |
| 7,694,509 | B2 | 4/2010 | Noirot et al. |
| 2007/0056273 | A1 | 3/2007 | Wills |
| 2009/0308052 | A1 | 12/2009 | Zhang et al. |

FOREIGN PATENT DOCUMENTS

| DE | 212005000024 U1 | 1/2007 |
| DE | 112009001451 T5 | 9/2011 |

OTHER PUBLICATIONS

Ohyama et al., New Concept Catalyzed DPF for Estimating Soot Loadings from Pressure Drop, SAE Technical Paper Series 2008-01-0620, 2008 World Congress, Detroit, MI, Apr. 14-17, 2008.
Markus Maly et al: "Influence of the Nitrogen Dioxide Based Regeneration on Soot Distribution;" SAE technical papers; Mar. 8, 2004; 2004-01-0823; SAE International; US.

*Primary Examiner* — Stephen Cherry
(74) *Attorney, Agent, or Firm* — Quinn Law Group, PLLC

(57) ABSTRACT

A method of monitoring soot mass in a particulate filter of an exhaust system includes determining a pressure differential across the filter, obtaining a first soot mass estimate by fitting the determined pressure differential to a first stored database of measured or modeled pressure differentials and corresponding measured soot masses taken during filter regeneration using a substantially similar filter previously loaded following a complete filter regeneration, and obtaining a second soot mass estimate by fitting the determined pressure differential to a second stored database of measured or modeled pressure differentials and corresponding measured soot masses taken during filter regeneration using a substantially similar filter loaded following an incomplete filter regeneration. Actual soot mass is estimated by calculating a weighted sum of the first and second soot mass estimates with weighting based on operating parameters indicative of regeneration efficiency. A monitoring system for a particulate filter is also provided.

11 Claims, 2 Drawing Sheets

METHOD OF MONITORING SOOT MASS IN A PARTICULATE FILTER AND MONITORING SYSTEM FOR SAME WITH CORRECTION FOR ACTIVE REGENERATION INEFFICIENCY

TECHNICAL FIELD

The invention relates to a method of monitoring soot mass in a particulate filter, and a monitoring system for the filter.

BACKGROUND

Particulate filters are designed to remove soot from the exhaust flow of an engine, such as a diesel or gasoline internal combustion engine. When the accumulated soot reaches a predetermined amount, the filter is "regenerated" either actively, by burning off the accumulated soot, or passively, such as by the use of a catalyst. Mathematical and empirical soot models have been used to estimate the amount of soot present in the filter so that timely disposal or regeneration of the filter can be assured. One soot model predicts the amount of soot in the filter based on the pressure drop in exhaust flow through the filter (i.e., a differential pressure across the filter). Accuracy of the soot model used is important, as functioning of the particulate filter is impaired if the amount of soot present is too great. An inaccurate soot model also causes the filter to be regenerated at lower soot concentrations (grams of soot per volume of the filter), which decreases fuel economy.

Active regeneration may be less than completely efficient (i.e., may result in residual soot even after regeneration is complete) due to nonhomogenous burning of soot. Nonhomogeneous burning changes the soot distribution in the filter and therefore reduces the correlation between pressure drop over the filter and soot mass in the filter. For example, the nonhomogeneous burning causes cracks in the soot layer, reducing resistance to flow. Therefore, the pressure drop over the filter is less. If the model does not account for the effect of nonhomogeneous burning, then the model will predict a lower soot mass in the filter than actually exists.

During soot loading, some models attempt to correct a pressure drop-based model to account for nonhomogeneous burning due to passive regeneration by correlating the difference between measured soot mass (by weighing the filter) and predicted soot mass (based on pressure drop) with engine speed, engine fuel, and altitude as Nox concentration reaches a predetermined level. This method is used during the soot loading process of the filter, but does not compensate for the nonhomogeneous burning caused by an active regeneration event as it does not account for the immediate offset between predicted and actual soot mass.

SUMMARY

Active regeneration may be inefficient if the oxygen level in the exhaust flow varies from an ideal amount, if the exhaust temperature is too low, and if the time of the regeneration is too short, all of which are impacted by the driving conditions (e.g., highway versus city driving). Accordingly, a method of monitoring soot mass in a particulate filter of an exhaust system includes determining a pressure differential between exhaust flowing into the filter and exhaust flowing out of the filter. A first soot mass estimate is obtained by fitting the determined pressure differential to a first stored database of measured or modeled pressure differentials and corresponding measured soot masses taken during filter regeneration using a substantially similar filter previously loaded following a complete filter regeneration. A second soot mass estimate is obtained by fitting the determined pressure differential to a second stored database of measured or modeled pressure differentials and corresponding measured soot masses taken during filter regeneration using a substantially similar filter loaded following an incomplete filter regeneration. As used herein a "complete" filter regeneration is a regeneration that results in no residual soot or no more than a predetermined minimal amount of soot. An "incomplete" filter regeneration is a regeneration that results in residual soot above a predetermined minimal amount.

Actual soot mass is then estimated by calculating a weighted sum of the first soot mass estimate and the second soot mass estimate with weighting based on operating parameters indicative of regeneration efficiency. The operating parameters may include oxygen levels measured by an oxygen sensor, exhaust temperatures measured by a temperature sensor, time since the start of regeneration, including time at each of the measured exhaust temperatures, the number of previous consecutive incomplete regenerations, and driving mode. "Driving mode" refers to whether the vehicle on which the filter is installed is being subjected to highway driving, city driving, or other recognized modes or combinations of modes as determined by monitoring parameters such as engine speed, engine loading, braking, etc.

A monitoring system for a particulate filter in an exhaust system for an engine may include an oxygen sensor positioned in the exhaust flow, a temperature sensor positioned in the exhaust flow, a differential pressure sensor positioned in fluid communication with an inlet and an outlet of the particulate filter and that measures a pressure differential across the particulate filter or a pressure sensor positioned in fluid communication with exhaust flow upstream of the particulate filter, and a processor.

The processor executes a first algorithm that determines a first soot mass estimate by fitting the determined pressure differential to a first stored database of measured or modeled pressure differentials and corresponding measured soot masses taken during filter regeneration following a complete regeneration. The processor also executes a second algorithm that determines a second soot mass estimate by fitting the determined pressure differential to a second stored database of measured or modeled pressure differentials and corresponding measured soot masses taken during filter regeneration following an incomplete regeneration. Further, the processor executes a third algorithm that determines a regeneration efficiency of a current regeneration of the filter based on operating parameters such as oxygen levels measured by the oxygen sensor, exhaust temperatures measured by the temperature sensor, time at each of the measured exhaust temperatures, number of previous consecutive incomplete regenerations, and driving mode. Finally, the processor executes a fourth algorithm that calculates a corrected soot mass estimate as a weighted sum of the first soot mass estimate and the second soot mass estimate. The weighting is based on the regeneration efficiency determined by the third algorithm. Thus, a soot mass estimate based solely on a pressure differential across the filter is corrected to account for the effect of operating parameters, including historical regeneration data, on regeneration efficiency.

The above features and advantages and other features and advantages of the present invention are readily apparent from the following detailed description of the best modes for carrying out the invention when taken in connection with the accompanying drawings.

DETAILED DESCRIPTION

Figure 1:
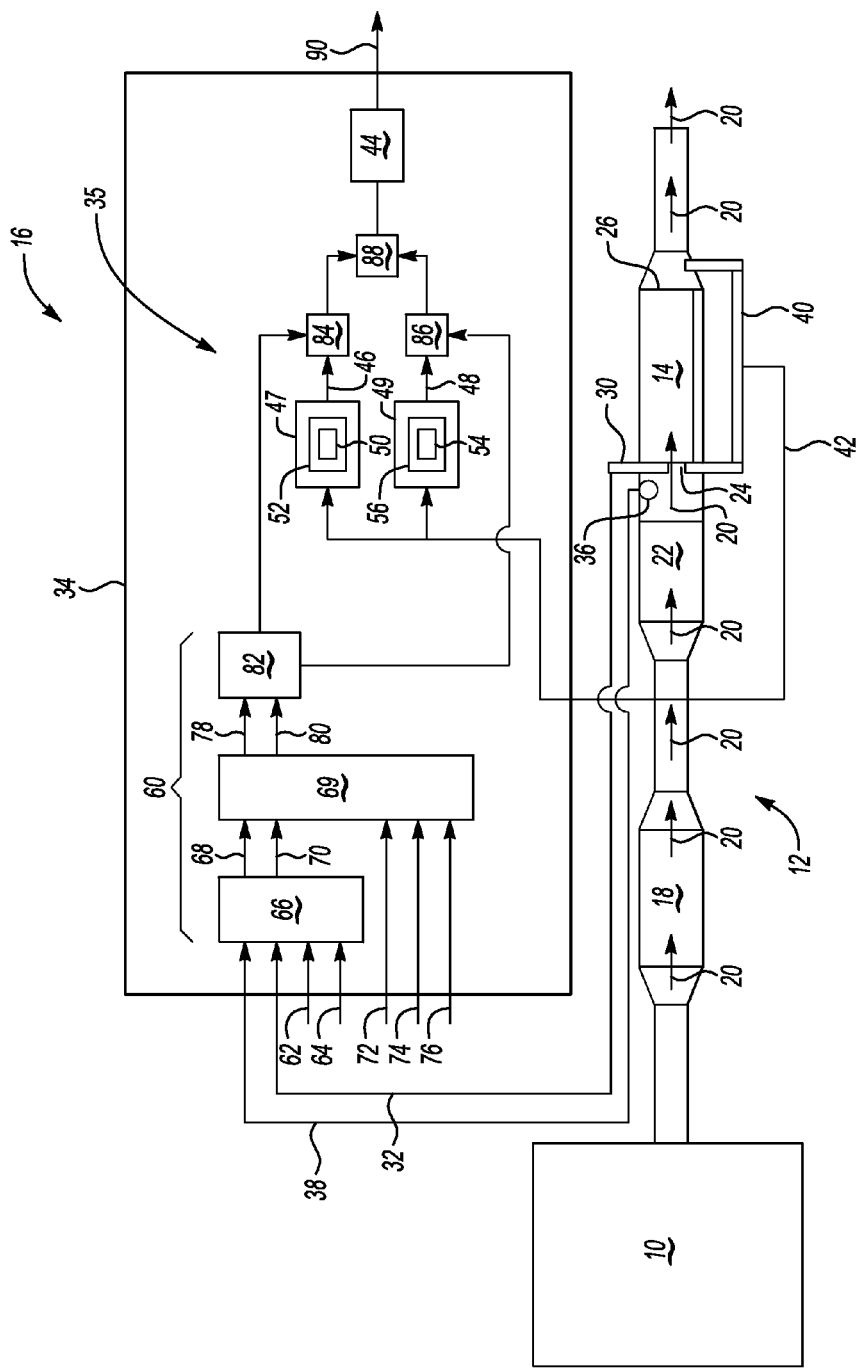
FIG. 1 is a schematic illustration of an engine with an exhaust system having a particulate filter with a particulate filter monitoring system including a processor.

Referring to the drawings, wherein like reference numbers refer to like components throughout the several views, FIG. 1 shows an engine 10 with an exhaust system 12 that includes a particulate filter 14. A monitoring system 16 for the particulate filter 14 is operable to monitor the amount of soot mass in the particulate filter 14 in order to ensure filter performance and enhance overall fuel economy and reduction of emissions.

The exhaust system 12 includes a diesel oxidation catalyst 18 that oxidizes and burns hydrocarbons in the exhaust flow 20 exiting the engine 10. Exhaust then flows through a selective catalytic reduction catalyst 22, which converts at least some of the nitrogen oxides in the exhaust flow 20 into water and nitrogen. Exhaust then flows from an inlet 24 of the filter 14 to an outlet 26 of the filter 14, and then exits the exhaust system 12. The exhaust system 12 may be arranged with the selective catalytic reduction catalyst 22 downstream of the particulate filter 14 without affecting the function of the monitoring system 16.

The monitoring system 16 uses data reflecting real-time operating parameters in the exhaust system 12 to estimate the amount of soot in the filter 14. The monitoring system 16 includes an oxygen sensor 30 positioned at least partially in fluid communication with exhaust flow 20 upstream of the particulate filter 14. The oxygen sensor 30 is operable to measure a first operating parameter, which is the concentration of oxygen in the exhaust flow 20, and to then provide a signal 32 to a controller 34. The oxygen sensor 30 is optional, and the monitoring system 16 may estimate the amount of soot in the filter 14 without data reflecting oxygen level. The controller 34 includes a processor 35, which is a set of algorithms 47, 49, 60 and 88, described below. The signal 32 is utilized by the controller 34 as further described below.

The monitoring system 16 also has a temperature sensor 36 mounted in the exhaust system 12 in fluid communication with the exhaust flow 20. The temperature sensor 36 measures a second operating parameter, which is the temperature of the exhaust flow 20 entering the inlet 24, and provides a signal 38 to the controller 34. The signal 38 correlates with the measured exhaust flow temperature. An additional temperature sensor may be used to measure the exhaust temperature at the filter outlet. The temperature of the exhaust flow 20 is indicative of the temperature of the filter 14 in that an average filter temperature can be modeled from the exhaust flow temperature. The signal 38 is utilized by the controller 34, as further described below.

The monitoring system 16 also includes a differential pressure sensor 40 that is operable to measure a third operating parameter, which is a pressure differential between exhaust flow at the inlet 24 and exhaust flow at the outlet 26 of the filter 14. The differential pressure sensor 40 emits a signal 42 that represents the measured pressure differential. The signal 42 is utilized by the controller 34 as further described below. Alternatively, a pressure sensor that measures pressure upstream of the filter 14 may be used instead of the differential pressure sensor 40. The pressure differential across the filter can then be determined using a modeled pressure downstream of the filter 14 that is based partially on exhaust mass flow rate.

The controller 34 is configured to determine a modeled filter soot mass, also referred to herein as a corrected soot mass estimate 44, which corrects for the inaccuracies of a predicted soot mass that is based only on the pressure differential across the filter 14. First and second different differential pressure-based soot mass estimations 46 and 48 are determined by respective first and second empirical algorithms 47 and 49 by mapping the signal 42 indicative of the differential pressure to empirical data 50 stored in a database 52, and to empirical data 54 stored in a database 56. If a differential pressure sensor 40 is used, then the data 50 includes measured differential pressure. If instead a pressure sensor upstream of the filter 14 is used, then the data 50 includes a modeled differential pressure based on the measured pressure upstream of the filter 14 and a modeled pressure downstream of the filter 14. Thus, the database 52 correlates differential pressure with actual filter soot mass based on empirical testing of particulate filters substantially identical to filter 14. During the testing in which the empirical data 50 is gathered and stored, one or more filters substantially identical to filter 14 are run over multiple soot loading cycles. Regeneration of the filter in these soot loading cycles is complete, so that the residual soot at the start of loading of each cycle is substantially zero, i.e., below a predetermined minimal value, and the filter is considered to be fully clean or deep-cleaned. The regeneration efficiency of each cycle is thus very high, and may be given a value of 1.0 on a scale of 0.0 to 1.0.

The empirical data 54 stored in database 56 also correlates differential pressure with actual filter soot mass based on empirical testing of particulate filters substantially identical to filter 14. If a differential pressure sensor 40 is used, then the data 54 includes measured differential pressure. If instead a pressure sensor upstream of the filter 14 is used, then the data 54 includes a modeled differential pressure based on the measured pressure upstream of the filter 14 and a modeled pressure downstream of the filter 14. During the testing in which the empirical data 54 is gathered and stored, one or more filters substantially identical to filter 14 are run over multiple soot loading cycles. However, regeneration of the filter in these soot loading cycles is incomplete, so that there is residual soot at the start of each loading cycle above the predetermined minimum value, and the filter is considered only partially clean. The regeneration efficiency of each cycle is thus greater than 0.0 and less than 1.0.

The controller 34 relies on actual operating parameters of the exhaust system 12 to determine an estimated regeneration efficiency of the filter 14 (from algorithm 60 as described below), and determine a corrected soot mass estimate 44 that is a weighting of the estimate obtained from the first algorithm 47 based on the database 52 of deep-cleaned filter regeneration data 50 and the estimate obtained from the second algorithm 49 based on the database 56 of only partially-cleaned filter regeneration data 54.

The processor 35 includes a third algorithm 60 that determines a regeneration efficiency (on a scale of 0.0 to 1.0) of a current regeneration of the filter 14 based on operating parameters indicative of regeneration efficiency. The operating parameters include mass flow rate of oxygen data provided by signal 32 and exhaust temperature data provided by signal 38 discussed above. Other operating parameters considered include the time elapsed since the most recent regeneration, as indicated by signal 62, and regeneration status (i.e., whether a regeneration cycle is currently being carried out), as indicated by signal 64. Data on regeneration status and time is available to the controller 34, as the controller 34 commands the engine 12 to perform according to certain parameters in order to carry out a regeneration cycle.

The operating parameter information provided by signals 32, 38, 62 and 64 is analyzed by a first portion 66 of the third algorithm 60. The third algorithm 60 produces a weighted average regeneration descriptor 68 and a maximum value regeneration descriptor 70 that represent initial estimates of the regeneration efficiency of the filter 14 based on the current operating parameters. The descriptors 68, 70 also represent 64 a categorization of the current driving mode of the vehicle, such as city mode or highway mode, determined by the first portion 66 of the third algorithm 60 from the signals 32, 38, 62 and 64. A categorization of city mode will be assigned a lower value regeneration descriptor than a categorization of highway mode, because regeneration of the filter 14 can be more complete under highway driving conditions.

A second portion 69 of the third algorithm 60 considers other operating parameters affecting the regeneration efficiency of the filter 14 to refine the descriptors 68, 70. The additional operating parameters considered include the soot present at the start of a prior regeneration, as indicated by signal 72, the residual soot present at the end of the prior regeneration, as indicated by signal 74, and a successive regeneration flag, as indicated by signal 76, which provides an indication as to whether each of the previous regenerations were complete or incomplete.

The second portion 69 then provides a regeneration quality estimate, represented by signal 78, between 0.0 and 1.0 based on an evaluation of the descriptors 68, 70 and signals 72, 74, 76, i.e., based on current operating parameters and historical regeneration data. The second portion 69 also determines the number of consecutive incomplete regenerations, as indicated by signal 80, from the historical operating information provided by signals 72, 74 and 76.

Using the regeneration quality estimate and the number of consecutive incomplete regenerations indicated by signals 78 and 80, a third portion 82 of the third algorithm 60 then determines a first correction coefficient 84 to assign to the first algorithm 47, i.e., to the soot prediction estimate 46 based only on pressure differential data (measured differential pressure or measured pressure upstream of the filter 14 and modeled pressure downstream of the filter 14, as described above) fit or mapped to a database 52 of data 50 on completely regenerated filters. The third portion 82 also determines a second correction coefficient 86 to assign to the second algorithm 49, i.e., to the soot prediction estimate 48 based only on pressure differential data (measured differential pressure or measured pressure upstream of the filter 14 and modeled pressure downstream of the filter 14, as described above) fit to a database 56 of data 50 on only partially regenerated filters. The coefficients 84, 86 represent the empirically-based determination of the third algorithm 60 as to the appropriate weighting of the estimates 46, 48 given the current and historical operating parameters.

A fourth algorithm 88 determines the weighted sum of the soot prediction estimates 46, 48 by multiplying the estimate 46 by the coefficient 84, multiplying the estimate 48 and by the coefficient 86, and adding the products to determine a corrected soot estimate 44. The corrected soot estimate 44 therefore not only corrects the soot estimates 46, 48 for the inaccuracies of relying on pressure differential alone by considering other operating parameters as well, but also applies the regeneration quality estimate, as indicated by the coefficients 84, 86.

When the corrected soot mass estimate 44 reaches a predetermined level, the controller 34 provides an output signal 90 that indicates a recommendation to perform filter regeneration. The signal 90 may be directed to the engine 10 to affect engine parameters to cause the increase in temperature of the exhaust flow 20.

Figure 2:
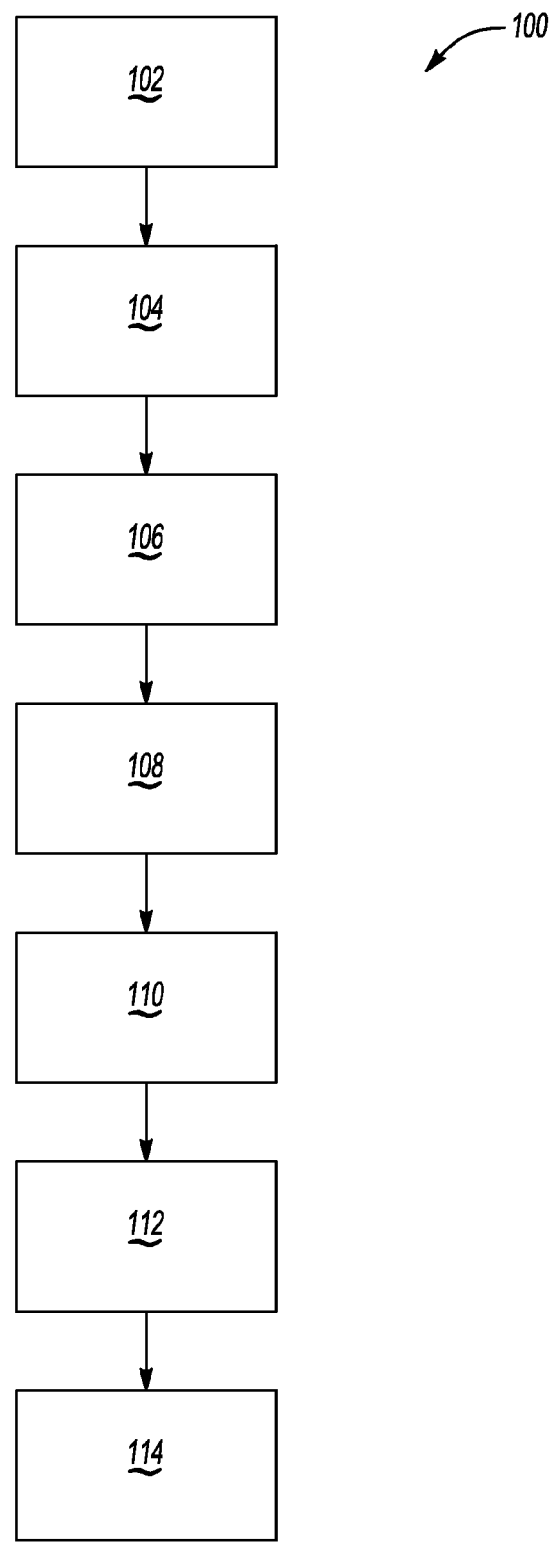
FIG. 2 is a flow diagram of a method of monitoring soot mass in the particulate filter of FIG. 1.

Referring to FIG. 2, a method 100 of monitoring the soot mass in the particulate filter 14 of exhaust system 12 is described with respect to the components of FIG. 1 and is carried out by the processor 35. The method 100 includes step 102, determining operating parameters indicative of regeneration efficiency. As described above, these operating parameters may include exhaust temperature, oxygen level (i.e., oxygen concentration in the exhaust flow), the time elapsed since a previous regeneration cycle was completed, the number of previous successive regeneration cycles resulting in incomplete regeneration, the initial and residual soot mass estimated for each of the previous regeneration cycles, and a recognition of driving mode from the operating parameters.

Concurrently, prior to, or after step 102, in step 104, the method 100 determines a pressure differential between exhaust flowing into the filter 14 and exhaust flowing out of the filter 14 (using measured differential pressure or measured pressure upstream of the filter 14 and modeled pressure downstream of the filter 14, as described above). From the pressure differential determination, the method 100 obtains in step 106, via a first algorithm 47, a first soot estimate 46 by fitting the determined pressure differential to a first stored database 52 of measured or modeled pressure differentials and corresponding measured soot data 50 taken during filter regeneration using a substantially similar filter previously loaded following a complete filter regeneration.

Also, from the pressure differential determination, the method 100 obtains in step 108, via a second algorithm 49, a second soot mass estimate 48 by fitting the determined pressure differential to a second stored database 56 of measured or modeled pressure differentials and corresponding measured soot data 54 taken during filter regeneration using a substantially similar filter loaded following an incomplete filter regeneration.

In step 110, the method 100 estimates regeneration quality (indicated by signal 78) based on the operating parameters (both current operating parameters and historical regeneration data), and determines in step 112 an appropriate weighting of the first and second soot mass estimates 46, 48 (i.e., appropriate coefficients between 1.0 and 0 to assign to the estimate 46 and the estimate 48 given the estimated regeneration quality and the historical regeneration data (provided by signals 72, 74, 76 and 78).

In step 114, the method 100 calculates a weighted sum of the first and second soot mass estimates 46, 48 using the coefficients determined in step 112 to achieve a corrected soot mass estimate 44 that better reflects actual soot mass than an estimate based on pressure differential alone, and accounts for estimated regeneration quality given the operating conditions and historical regeneration data.

While the best modes for carrying out the invention have been described in detail, those familiar with the art to which this invention relates will recognize various alternative designs and embodiments for practicing the invention within the scope of the appended claims.

The invention claimed is:

1. A method of monitoring soot mass in a particulate filter of an exhaust system comprising:
   determining a pressure differential between exhaust flowing into the filter and exhaust flowing out of the filter;
   obtaining a first soot mass estimate by fitting the determined pressure differential to a first stored database of measured or modeled pressure differentials and corresponding measured soot masses taken during filter regeneration using a substantially similar filter loaded following a complete filter regeneration;

obtaining a second soot mass estimate by fitting the determined pressure differential to a second stored database of measured or modeled pressure differentials and corresponding measured soot masses taken during filter regeneration using a substantially similar filter loaded following an incomplete filter regeneration; and estimating actual soot mass by calculating a weighted sum of the first soot mass estimate and the second soot mass estimate with weighting based on operating parameters indicative of regeneration efficiency.

2. The method of claim 1, wherein the operating parameters indicative of regeneration efficiency include exhaust temperature.

3. The method of claim 1, wherein the operating parameters indicative of regeneration efficiency include oxygen level in the exhaust flow.

4. The method of claim 1, wherein the operating parameters indicative of regeneration efficiency include time since completion of a prior regeneration.

5. The method of claim 1, wherein the operating parameters indicative of regeneration efficiency include number of previous consecutive regeneration cycles resulting in incomplete regeneration.

6. The method of claim 1, wherein the operating parameters indicative of regeneration efficiency include driving mode.

7. The method of claim 1, wherein the determining a pressure differential is by measuring the pressure differential or by measuring a pressure upstream of the filter and modeling a pressure downstream of the filter.

8. A method of monitoring soot mass in a particulate filter of an exhaust system comprising:

determining operating parameters indicative of regeneration efficiency including exhaust temperature, time since completion of a previous regeneration, number of previous consecutive incomplete regenerations, and driving mode;

determining a pressure differential between exhaust flowing into the filter and exhaust flowing out of the filter;

obtaining a first soot mass estimate by fitting the determined pressure differential to a first stored database of measured pressure differentials and corresponding measured soot masses taken during filter regeneration using a substantially similar filter loaded following a substantially complete regeneration;

obtaining a second soot mass estimate by fitting the determined pressure differential to a second stored database of measured pressure differentials and corresponding measured soot masses taken during filter regeneration using a substantially similar filter loaded following an incomplete regeneration; and estimating actual soot mass by calculating a weighted sum of the first soot mass estimate and the second soot mass estimate with weighting based on the operating parameters indicative of regeneration efficiency.

9. The method of claim 8, wherein the determining a pressure differential is by measuring the pressure differential or by measuring a pressure upstream of the filter and modeling a pressure downstream of the filter.

10. The method of claim 8, wherein the operating parameters indicative of regeneration efficiency include oxygen concentration in the exhaust.

11. A monitoring system for a particulate filter in an exhaust system for an engine comprising:

a temperature sensor positioned in the exhaust flow;

a pressure sensor positioned in fluid communication with the exhaust flow and that measures one of a pressure differential across the particulate filter and a pressure upstream of the particulate filter; and a processor that executes a first algorithm that determines a first soot mass estimate by fitting the pressure differential measured by the pressure sensor or a modeled pressure differential based on the pressure upstream of the particulate filter and a modeled downstream pressure to a first stored database of measured or modeled pressure differentials and corresponding measured soot masses taken during filter regeneration following a complete regeneration;

a second algorithm that determines a second soot mass estimate by fitting the pressure differential measured by the pressure sensor or a modeled pressure differential based on the pressure upstream of the particulate filter and a modeled downstream pressure to a second stored database of measured or modeled pressure differentials and corresponding measured soot masses taken during filter regeneration following an incomplete regeneration;

a third algorithm that determines a regeneration efficiency of the filter based at least in part on exhaust temperatures measured by the temperature sensor, time at each of the measured exhaust temperatures, number of previous consecutive incomplete regenerations, and driving mode; and a fourth algorithm that calculates a corrected soot mass estimate as a weighted sum of the first soot mass estimate and the second soot mass estimate weighted based on the regeneration efficiency determined by the third algorithm.

* * * * *